(12) United States Patent
Tian

(10) Patent No.: US 11,686,909 B2
(45) Date of Patent: Jun. 27, 2023

(54) UTILITY POLE LOCALIZATION USING DISTRIBUTED ACOUSTIC SENSING

(71) Applicant: NEC Laboratories America, Inc., Princeton, NJ (US)

(72) Inventor: Yue Tian, Princeton, NJ (US)

(73) Assignee: NEC Corporation, Tokyo (JP)

( * ) Notice: Subject to any disclaimer, the term of this patent is extended or adjusted under 35 U.S.C. 154(b) by 94 days.

(21) Appl. No.: 17/228,577

(22) Filed: Apr. 12, 2021

(65) Prior Publication Data

US 2021/0318504 A1    Oct. 14, 2021

Related U.S. Application Data

(60) Provisional application No. 63/009,628, filed on Apr. 14, 2020.

(51) Int. Cl.
| | | |
|---|---|---|
| *G02B 6/44* | (2006.01) | |
| *G01S 5/16* | (2006.01) | |
| *H04B 10/27* | (2013.01) | |
| *G02B 6/12* | (2006.01) | |

(52) U.S. Cl.
CPC .............. *G02B 6/4401* (2013.01); *G01S 5/16* (2013.01); *H04B 10/27* (2013.01); *G02B 2006/12138* (2013.01)

(58) Field of Classification Search
CPC ........ G02B 6/4401; G02B 2006/12138; G02B 6/483; G01S 5/16; G01S 17/88; G01S 15/88; H04B 10/27; G01H 9/004
See application file for complete search history.

(56) References Cited

U.S. PATENT DOCUMENTS

| | | | | |
|---|---|---|---|---|
| 7,848,645 | B2 * | 12/2010 | Healey ................... | H04B 10/85 398/16 |
| 2003/0174924 | A1 * | 9/2003 | Tennyson ........... | G01D 5/35383 374/E11.015 |
| 2004/0011950 | A1 * | 1/2004 | Harkins ................. | G01K 11/32 250/269.1 |
| 2012/0275751 | A1 * | 11/2012 | Krabshuis ............ | G02B 6/0281 385/126 |
| 2014/0336973 | A1 * | 11/2014 | Froggatt ............ | G01B 11/0658 702/104 |
| 2016/0258743 | A1 * | 9/2016 | Yao ......................... | G01L 1/242 |
| 2017/0276523 | A1 * | 9/2017 | Lally ...................... | G01D 5/353 |
| 2019/0025095 | A1 * | 1/2019 | Steel ................... | G01D 5/35383 |
| 2019/0136639 | A1 * | 5/2019 | Bhongale ............... | G02B 6/443 |
| 2019/0186958 | A1 * | 6/2019 | Godfrey ................ | G01H 9/004 |
| 2019/0197846 | A1 * | 6/2019 | Englund ............. | H04R 23/008 |
| 2019/0346296 | A1 * | 11/2019 | Cipullo ............. | G01D 5/35316 |

* cited by examiner

*Primary Examiner* — Ellen E Kim
(74) *Attorney, Agent, or Firm* — Joseph Kolodka

(57) ABSTRACT

Aspects of the present disclosure describe distributed fiber optic sensing (DFOS) distributed acoustic sensing (DAS) systems, methods, and structures that advantageously provide the localization of utility poles along a route of fiber optic cable.

3 Claims, 5 Drawing Sheets

UTILITY POLE LOCALIZATION USING DISTRIBUTED ACOUSTIC SENSING

CROSS REFERENCE

This disclosure claims the benefit of U.S. Provisional Patent Application Ser. No. 63/009,628 filed 14 Apr. 2020 the entire contents of which is incorporated by reference as if set forth at length herein.

TECHNICAL FIELD

This disclosure relates generally to distributed fiber optic sensing (DFOS) applications and more particularly to utility pole localization using distributed acoustic sensing (DAS).

BACKGROUND

As is known, countless numbers of utility poles support overhead cables including fiber optic cable for communications and conventional electrical cables for electricity distribution. As will be appreciated by those skilled in the art, such overhead cables oftentimes require maintenance due to weather related conditions and events that damage the cables. Yet while such cables are attached to utility poles—generally along fixed routes—it is nevertheless difficult for telecommunications carriers and/or utility companies to locate/estimate a location of a particular pole and in particular how far each pole is from a point of origin—such as a fiber cable starting point—due to—for example—extra cable loops/coils for future drops, branches, and redundancy.

SUMMARY

An advance in the art is made according to aspects of the present disclosure directed to distributed fiber optic sensing (DFOS)/distributed acoustic sensing (DAS) systems, methods, and structures that are advantageously provide for the localization of utility poles supporting aerial cables.

In sharp contrast to the prior art, systems methods, and structures according to aspects of the present disclosure employ DAS methodologies, in conjunction with mechanical impact and signal processing to localize utility pole(s) along an optical fiber cable route. By using a DAS interrogator with a deployed aerial optical cable as sensing medium, systems, methods, and structures according to aspects of the present disclosure detect strain changes in the optical fiber cable and determine the location(s) of those strain changes.

Operationally, when strains are detected via DAS, mechanical impacts (i.e., hammer knocks) are provided to target pole(s) along the fiber route in a direction increasingly further from its origin—i.e., location of the interrogator. The aerial fiber cable experiences a sudden strain change due to the mechanical vibrations of the pole(s).

During such mechanical impacts, the fiber cable is compressed on one side of the pole experiencing the impact and stretched on the other side of the pole—due to slight movement of the pole along the direction of the fiber cable. Advantageously, systems, methods, and structures according to aspects of the present disclosure determine a boundary point between compression and tension in a DAS signal—due to this mechanical impact—and the pole receiving the mechanical impact can be localized on the aerial fiber optical cable route. Once a DAS interrogator is deployed and operated according to aspects of the present disclosure, all utility poles along such fiber route may be localized.

BRIEF DESCRIPTION OF THE DRAWING

A more complete understanding of the present disclosure may be realized by reference to the accompanying drawing in which.

DESCRIPTION

Figure 1:
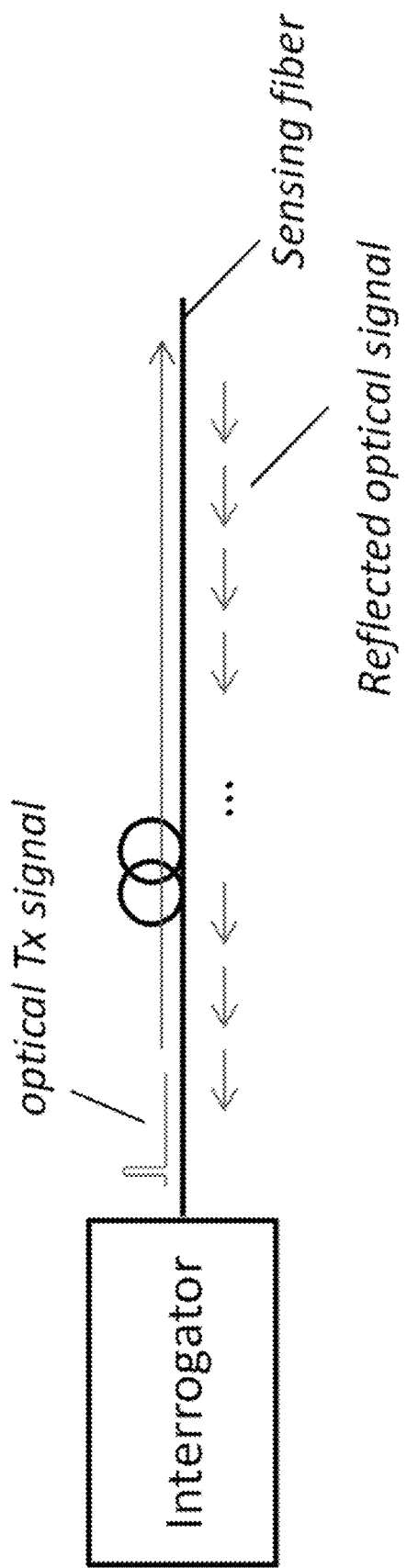
FIG. 1 is a schematic diagram showing an illustrative prior art distributed fiber optic sensing arrangement including optical sensing fiber and interrogator.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. FIG. 1 is a schematic diagram showing an illustrative prior art distributed fiber optic sensing arrangement including optical sensing fiber and interrogator.

As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DAS (Distributed Acoustic Sensor) interrogator to recover a vibration occurring anywhere along a sensing fiber in equivalent sampling frequency of the pulse repetition rate. For example, for a DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule.

Figure 2:
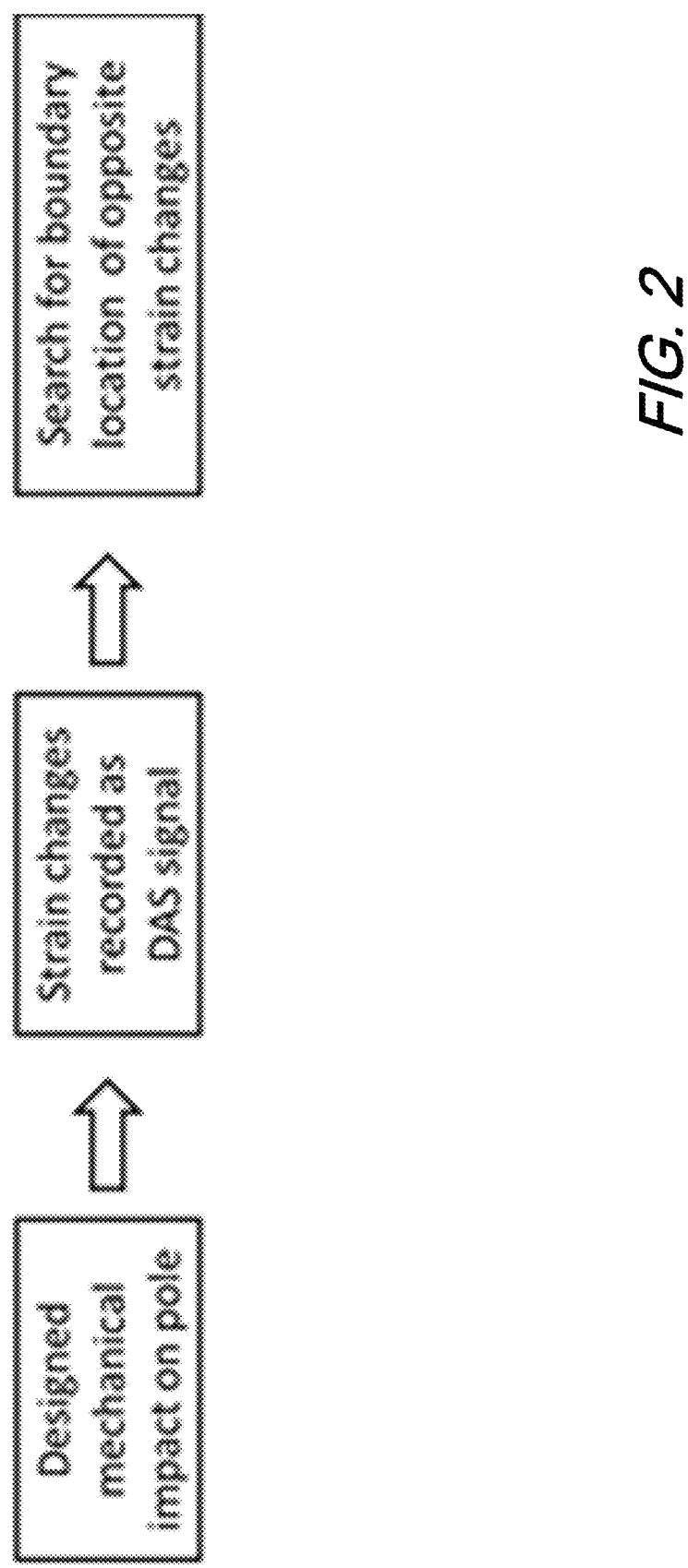
FIG. 2 is a schematic block diagram showing an illustrative method of utility pole localization using DFOS/DAS technologies according to aspects of the present disclosure.

FIG. 2 is a schematic block diagram showing an illustrative method of utility pole localization using DFOS/DAS technologies according to aspects of the present disclosure. To localize a target utility pole location with respect to an optical fiber cable as part of a DFOS/DAS system, a DAS interrogator is configured to continuously monitor strain changes along the length of the optical fiber cable. First, an instant mechanical impact, such as a hammer blow/impact (knock) is imparted on a target utility pole in a direction along the optical fiber cable mounted/suspended on the pole. Such direction would be substantially parallel to the direction of the cable.

As a result of the impact, strain changes occur in the fiber cable, which are detected/capture/recorded as DAS signal (s). From the recorded DAS signal(s), the pole's location is obtained by searching/identifying boundary locations between a tension and a compression of the optical fiber cable at a beginning point of impact. This overall process can be repeated multiple times to increase localization accuracy. Advantageously, the process can be employed on all poles carrying/suspending an optical fiber in a route with a single DAS.

Figure 3:
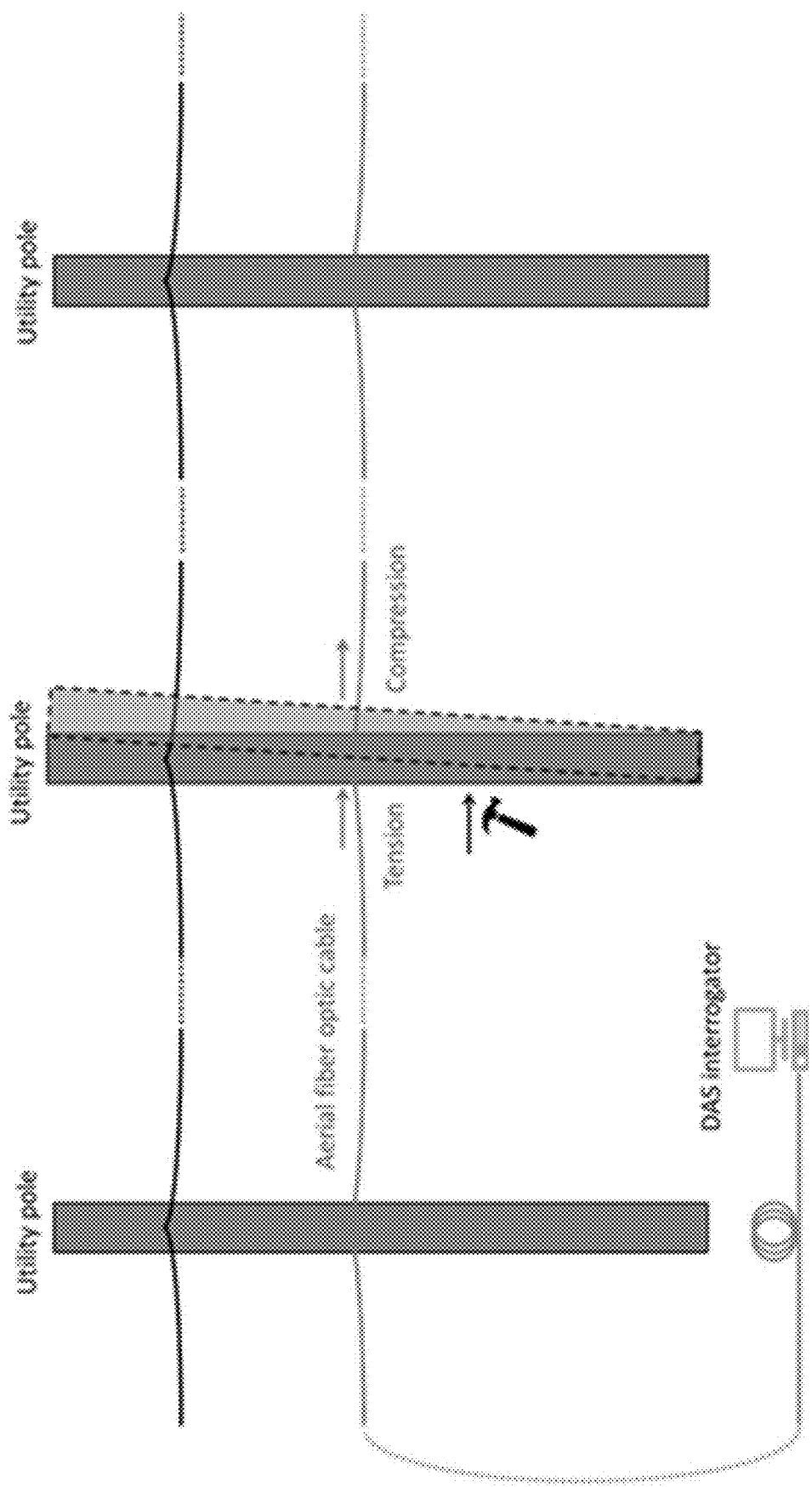
FIG. 3 is a schematic diagram illustrating utility pole localization using DFOS/DAS technologies according to aspects of the present disclosure.

FIG. 3 is a schematic diagram illustrating utility pole localization using DFOS/DAS technologies according to aspects of the present disclosure. As shown in that figure, a series of utility poles are connected by an aerial fiber optic cable that is suspended/carried by all of the poles. The fiber optic cable is a sensor part of a DOFS/DAS system and optically connected to the DAS interrogator. From this figure, we can understand an overall operation.

We note that the suspended fiber optic cable shown in the figure may be providing any type of known communications/information/etc service(s) that are commonly conveyed by such facilities. As will be appreciated by those skilled in the art, telecommunications, television, information, monitoring are but a subset of known services so provided currently. Of further advantage, our inventive operation may be performed on installations having live traffic conveyed thereon/therein.

First, to an existing suspended fiber optic cable, a DAS interrogator is optically coupled to one end of the fiber optic cable. The DAS interrogator may include further system components such as an analyzer and computer known in the art. The interrogator is operated so as to measure strain changes in the cable and record them as DAS signal(s).

Next, an instant mechanical impact is applied/provided to a utility pole of interest. Such mechanical impact may be as simple as a hammer knock or impact applied to the pole of interest. The mechanical impact is provided/applied to the pole in a direction substantially parallel to the direction of the fiber cable—as illustrated in the figure.

When such impact is applied in the direction of the cable, the aerial fiber is instantly stretched in the direction of the impact (in the figure to the right) producing a tension in the fiber optic cable as the utility pole receiving the impact is moved by the impact. Simultaneously, a compression is made in another length of the fiber optic cable. Accordingly, when a pole is so struck, a tension is produced in a length of the fiber optic cable on one side of the utility pole, and a compression is produced in a length of the fiber optic cable on the other side of the utility pole—as a result of the movement of the pole resulting from the impact. As will be understood by those skilled in the art, as the pole is moved by impact, it "pulls" (tension) the fiber optic cable from one end and "pushes" (compression) the fiber optic cable toward the other end. The compression will be in the direction that the pole moves from the impact.

Figure 4:
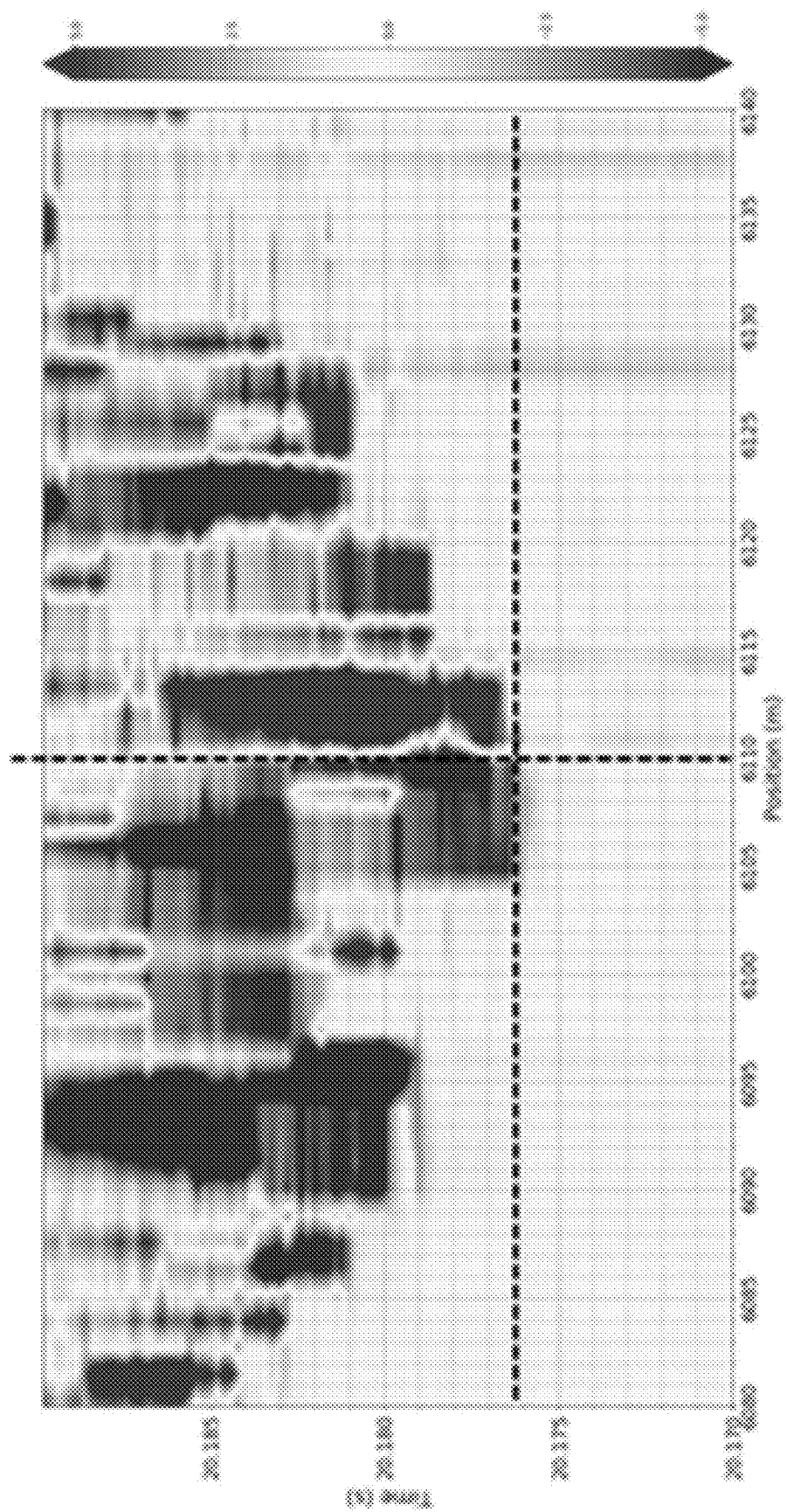
FIG. 4 is a plot showing an illustrative mechanical impact to a utility pole for localization showing location of strain changes in the optical sensing fiber vs. time of the strain changes according to aspects of the present disclosure.

After impact, the mechanical impact event is captured by the DAS interrogator and recorded as DAS signal(s). An exemplary DAS signal of a hammer knock/impact is visualized in FIG. 4, which is a plot showing an illustrative mechanical impact to a utility pole for localization showing location of strain changes in the optical sensing fiber vs. time of the strain changes according to aspects of the present disclosure.

With reference to that plot, the x-axis represents the location of strain changes, while the y-axis represents the time of strain changes. The gradations of the signal represent the intensity of the strain changes as marked by the bar on the right of the plot. Thus, the different gradations represent opposite signs of strain changes, namely tension and compression. From the shape of the signal, it is apparent that the impact event occurs at the time point shown by the dotted line, since it represents the earliest time point of any vibration.

At this time point (about 20.176 s)—marked by the horizontal dashed line the strain changes are clearly divided vertically corresponding to tension and compression. By locating the boundary between the two halves of the signal at the event starting time, the location of this impact can be easily pinpointed at about 6110 m, marked by the vertical dashed line. The location of the boundary is the pole's location on the fiber cable.

After this above procedure is performed on a particular utility pole, it may be repeated on another pole(s) suspending the same fiber optic cable—in sequence—to localize multiple utility poles suspending the fiber optic cable.

Figure 5:
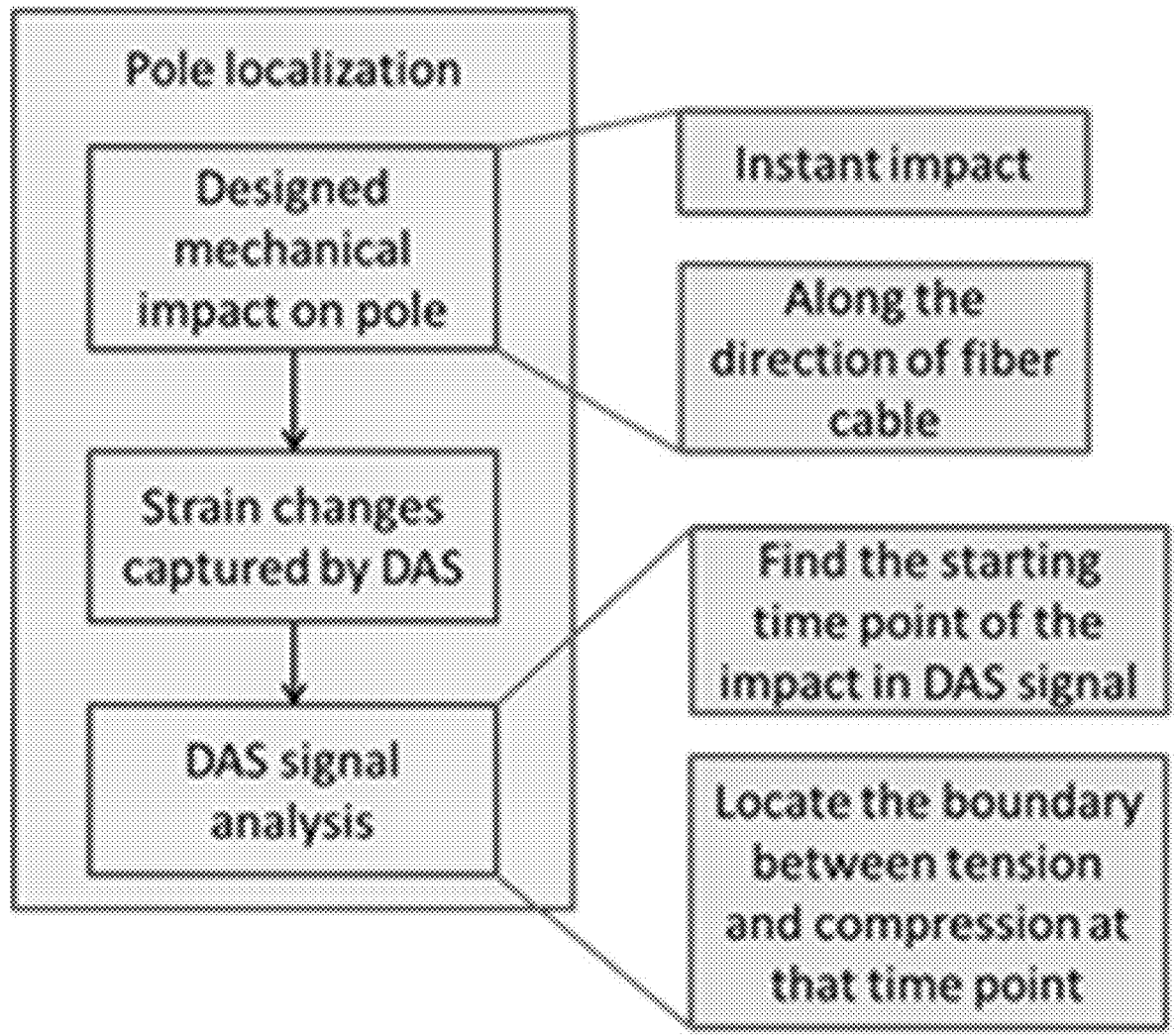
FIG. 5 is a schematic block diagram showing an illustrative method overview of utility pole localization using DFOS/DAS technologies according to aspects of the present disclosure.

FIG. 5 is a schematic block diagram showing an illustrative method overview of utility pole localization using DFOS/DAS technologies according to aspects of the present disclosure.

As we have shown and described, our disclosure describes a method and structures to localize utility pole locations relative to a length of optical fiber cable, by using DAS and designed mechanical impacts imparted on the poles. The mechanical impact creates strain changes in the optical fiber cable mounted on the poles. The strain changes are detected and recorded by DAS. By analyzing the DAS signal(s), pole location(s) relative to the length of fiber optic cable can be determined.

There are two points of interest about the impact(s) that are worth noting. First, such impact is an instant impact and it must be in a direction along the fiber cable—substantially parallel to the fiber cable direction.

Similarly, in analyzing the DAS signal(s) to localize the utility pole(s) of interest, first a starting time point of the impact in the DAS signal(s) is determined, and then a boundary location between tension and compression at the starting time point is ascertained. This boundary location is indicative of the location of the utility pole of interest namely, the one that received the mechanical impact.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for localizing a plurality of utility poles, each suspending a portion of a fiber optic cable, the method comprising:
   i) providing a distributed fiber optic sensing (DFOS)/distributed acoustic sensing (DAS) system including:
      a DFOS/DAS interrogator in optical communication with the fiber optic cable suspended by the plurality of utility poles, said DFOS/DAS interrogator configured to detect strain changes in the fiber optic cable from DAS signals returned from the fiber optic cable;
   ii) continuously operating the DFOS/DAS system to detect the strain changes in the fiber optic cable and recording same, while providing a mechanical impact to one of the plurality of utility poles, the mechanical impact made in a direction substantially parallel to the fiber optic cable, such that a tension strain is created in a length of the fiber optic cable located at the one side of the utility pole mechanically impacted, and a compression strain is created in a length of the fiber optic cable located at another side of the utility pole mechanically impacted;
   iii) repeating step ii above for at least three utility poles of the plurality of utility poles suspending the fiber optic cable;
   iv) determining strain boundary locations along the length of the fiber optic cable from boundary points between tension and compression in the returned DAS signals resulting from the compression strain and tension strains; and
   v) determining, locations of the plurality of utility poles along the length of the fiber optic cable from the determined strain boundary locations.

2. The method of claim 1 wherein the mechanical impact is imparted to the utility pole along a same direction as the fiber optic cable.

3. The method of claim 2 wherein the mechanical impact is an instant impact.

* * * * *